(12) United States Patent
Richards

(10) Patent No.: US 8,662,453 B2
(45) Date of Patent: Mar. 4, 2014

(54) RELATING TO AIR-BREATHING FLIGHT VEHICLES

(75) Inventor: Clifford John Richards, Bristol (GB)

(73) Assignee: MBDA UK Limited, Hertfordshire (GB)

(*) Notice: Subject to any disclaimer, the term of this patent is extended or adjusted under 35 U.S.C. 154(b) by 128 days.

(21) Appl. No.: 12/640,579

(22) Filed: Dec. 17, 2009

(65) Prior Publication Data

US 2010/0181436 A1 Jul. 22, 2010

(30) Foreign Application Priority Data

Oct. 23, 2008 (EP) .................................... 08253441
Oct. 23, 2008 (GB) .................................... 0819473.0

(51) Int. Cl.
B64D 33/02 (2006.01)

(52) U.S. Cl.
USPC ....................... 244/207; 244/35 A; 244/53 B

(58) Field of Classification Search
USPC ..... 244/1 N, 198, 35 A, 208, 53 B, 207, 53 A
See application file for complete search history.

(56) References Cited

U.S. PATENT DOCUMENTS

| | | | |
|---|---|---|---|
| 2,957,306 A * | 10/1960 | Attinello | 137/561 R |
| 3,690,102 A | 9/1972 | Du Pont | |
| 3,815,848 A * | 6/1974 | Alperin | 244/1 N |
| 4,821,512 A | 4/1989 | Guile et al. | |
| 4,835,971 A | 6/1989 | Romey et al. | |
| 4,930,309 A | 6/1990 | Hartman | |
| 5,072,581 A | 12/1991 | Harshman | |
| 5,085,048 A | 2/1992 | Kutschenreuter, Jr. et al. | |
| 5,255,513 A | 10/1993 | Kutschenreuter, Jr. et al. | |
| 5,447,283 A * | 9/1995 | Tindell | 244/207 |
| 5,694,766 A | 12/1997 | Smereczniak et al. | |
| 6,142,425 A * | 11/2000 | Armanios et al. | 244/207 |

(Continued)

FOREIGN PATENT DOCUMENTS

| | | |
|---|---|---|
| EP | 0 367 619 A1 | 5/1990 |
| EP | 1684406 | 7/2006 |

(Continued)

OTHER PUBLICATIONS

Notification of Transmittal of the International Search Report and the Written Opinion of the International Searching Authority (Forms PCT/ISA/220, PCT/ISA/210 and PCT/ISA/237) issued in the corresponding European International Application No. PCT/GB2009/051421 dated May 3, 2010.

(Continued)

*Primary Examiner* — Timothy D Collins
*Assistant Examiner* — Brian M O'Hara
(74) *Attorney, Agent, or Firm* — Buchanan Ingersoll & Rooney PC

(57) ABSTRACT

An air intake for a supersonic air-breathing flight vehicle introduces or injects fluid in order to create predetermined regions of separated flow and an attendant fluid shear layer. This shear layer forms an aerodynamic boundary for the capture flow with a profile determined and optimised by appropriate injection of fluid. The aerodynamic boundary so generated replaces mechanically moveable solid surfaces used to vary the geometry of prior-art intakes. Use of an introduced or injected fluid can provide an advantage of a variable geometry, but with reduced weight and reduced mechanical complexity. In some embodiments, the injection of fluid has the effect of re-energizing any ingested boundary layer, thus obviating the conventional requirement for a bleed system to provide boundary layer control.

14 Claims, 5 Drawing Sheets

(56) References Cited

U.S. PATENT DOCUMENTS

| | | |
|---|---|---|
| 6,655,632 B1 | 12/2003 | Gupta et al. |
| 6,880,342 B1 | 4/2005 | Moorhouse |
| 7,111,449 B1 | 9/2006 | Stebbings |
| 2007/0151254 A1 | 7/2007 | Gupta et al. |
| 2009/0206207 A1* | 8/2009 | Rethorst ................ 244/207 |
| 2009/0219128 A1 | 9/2009 | Elliott et al. |

FOREIGN PATENT DOCUMENTS

| | | |
|---|---|---|
| GB | 749767 | 5/1953 |
| GB | 2 211 595 A | 7/1989 |
| JP | 60245481 | 12/1985 |
| JP | 7-19117 A | 1/1995 |
| JP | 2002-54504 A | 2/2002 |

OTHER PUBLICATIONS

Great Britain Search Report for GB 0819473.0 completed Apr. 29, 2009.
European Search Report for EP 08253441.3 completed May 8, 2009.
International Search Report in corresponding PCT/GB2010/051936, dated Mar. 24, 2011, 2 pps.
Written Opinion of the International Searching Authority, dated Mar. 24, 2011, 8 pps.

* cited by examiner

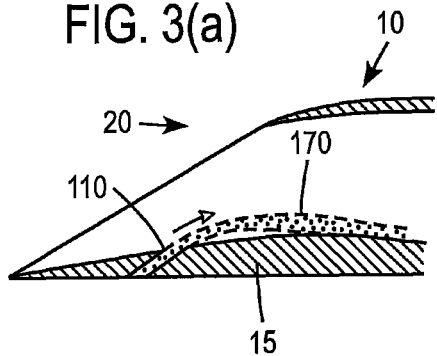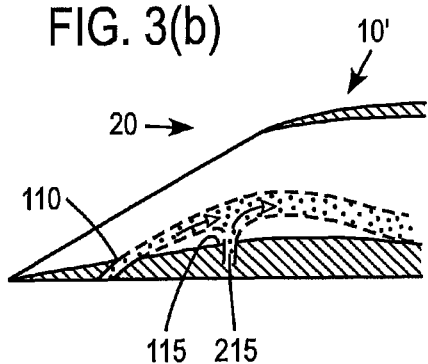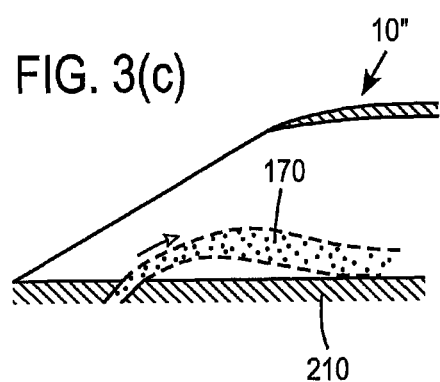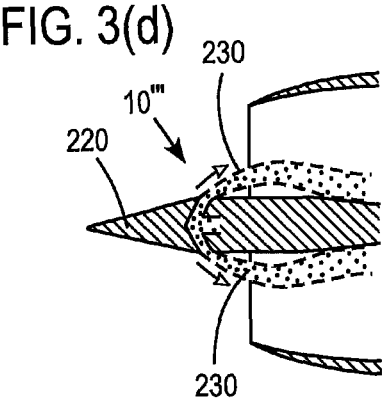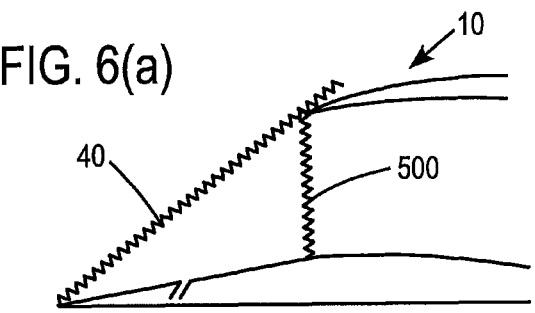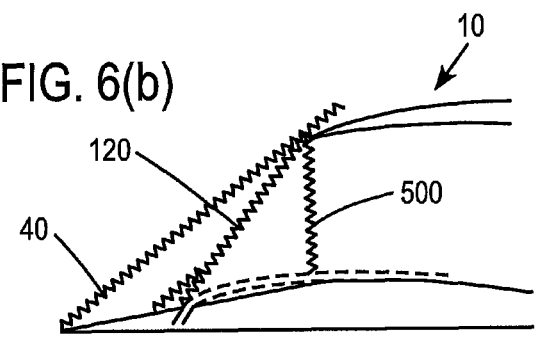

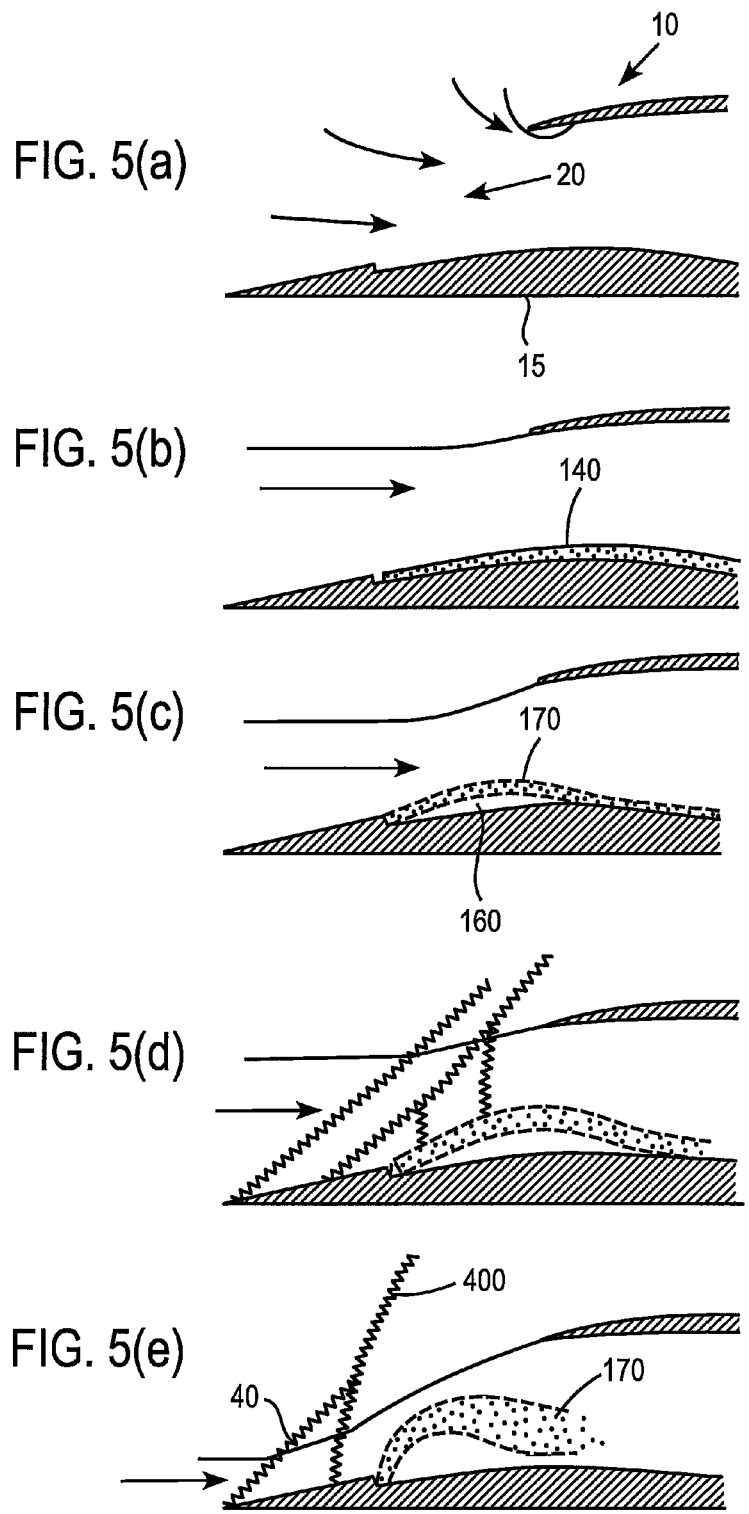

RELATING TO AIR-BREATHING FLIGHT VEHICLES

FIELD OF THE INVENTION

This invention relates to controlling the effective shape of the compression surfaces of a supersonic engine intake to the field of air-breathing flight vehicles. The invention relates in particular to a flight vehicle having an air-breathing engine with a variable-geometry air intake. The invention relates especially, although not exclusively, to an air intake for an air-breathing engine for a supersonic flight vehicle.

BACKGROUND ART

Many flight vehicles, for example aircraft, obtain forward propulsion from air-breathing engines, i.e. jet engines. In the powerplant system of such an aircraft, air is taken in through a forward-facing air-intake and mixed with fuel, the mixture is ignited, and resultant exhaust gases are expelled, providing forward thrust. Optimisation of the geometric shape of the air intake according to flight condition and engine demand is known to provide performance benefits. Those benefits are particularly significant when flight vehicles are travelling faster than the speed of sound in air; i.e. in the supersonic flight regime.

In order to achieve optimisation of its geometric shape, the entry of a supersonic air intake may be equipped with surfaces angled to the local flow direction, which are used to generate a system of shock waves. The configuration of those features determines the performance efficiency and viability of the intake. For an axi-symmetric intake these "compression" surfaces typically take the form of cone-like centrebodies, whilst for rectangular intakes they generally take the form of a wedge or series of wedges. Actuating the surfaces can provide performance and operating benefits; however, there is significantly increased complexity, mass and cost, especially for axi-symmetric intake configurations.

A flight-vehicle air intake typically comprises a plurality of compression surfaces, typically including a surface having a leading edge, and a cowl having a lip rearward of the body's leading edge.

An oblique shock wave typically forms at the leading edge of an air-intake of a supersonic flight vehicle, and extends towards the intake cowl lip, but, depending on conditions, the shock may extend forwards (upstream) of the cowl lip, or rearwards (downstream) of it. For example, increasing the Mach number of the vehicle will generally cause the shock wave to lean backwards, towards the rear of the vehicle, whilst reducing vehicle Mach number will have the opposite effect. It is desirable to minimise the total pressure loss across the shock system, but if the shock wave extends rearward of the cowl lip, inside the intake, a severe shock loss may occur at the cowl lip. On the other hand, if the shock wave is located ahead of the cowl lip, subsonic air behind the shock wave spills around the outside of the air intake and is accounted as a form of drag. Therefore, it is generally desirable to optimise the position of the shock wave relative to the cowl lip. It may typically be desirable to keep the shock wave on the cowl lip.

Where multiple shocks are present and intersect, an interface vortex sheet can be formed at their intersection, which can cause an instability known as "buzz". Buzz is a cyclic interaction of the shock system and the flow within the intake, causing instabilities in the engine operation.

In a known supersonic flight vehicle, parts of an air intake are moved mechanically to vary the geometric shape of the intake. The parts moved include in particular those parts that form the internal or external flow compression surfaces and throat profiles.

In an example of a prior-art system (FIG. 1), a powerplant system 5 including an air-breathing engine 7 has an air intake 10, defining an air intake aperture 20, and having a lower leading edge 30. At supersonic speeds, leading edge 30 slows approaching air, causing a leading-edge shock-wave 40.

To reduce the effects of the leading-edge shock wave, the air intake aperture 20 has a lower surface comprising, immediately rearward of its leading edge, a fixed compression surface 15, and, rearward of that, a flap 50. Flap 50 is pivotable and attached adjacent to the fixed compression surface 15, and is also attached to the surface via piston cylinder 60. Flap 50 provides a moveable compression surface 55, which is moved by the action of piston 60 on flap 50.

Piston 60, and hence flap 50, moves from a retracted position, in which flap 50 lies within a recess 65 in fixed compression surface 15, to an extended position, in which flap 50 extends a substantial way across air-intake aperture 20. When flap 50 is in the extended position, a second, flap-induced shock-wave 70 forms from near where flap 50 is pivoted. The presence of the second shock-wave can produce powerplant performance benefits.

When the flight vehicle speeds up, the angle of flap 50 is increased, to counter the movement of the shock wave, and to bring it back to cowl lip 130. Similarly, when the engine mass flow is throttled, the angle of flap 50 is reduced accordingly. Greater efficiency is achieved with a variable geometry.

That approach to providing a variable-geometry air intake adds to the structural weight and complexity of the flight vehicle, which for many applications can severely reduce the net benefit from the variable geometry. Another example of a complex prior-art design is a translating or expanding conical centrebody (rather than flap 50) provided to make variable the geometry of an axi-symmetric intake.

As is well known, a supersonic flow can only be turned at a shock-wave. A shock wave intersecting with a surface can produce a very large pressure change in the boundary layer, causing it to separate from the rest of the flow. Various arrangements are used to avoid this; for example a diverter, in the form of a leading edge lip, may be used to separate it from the rest of the flow, and divert it away from the engine intake. A bleed (in the form of an aperture through which air is blown tangentially along the surface of the intake) may be used to re-invigorate the boundary layer.

In known prior art arrangements, particularly used in Ramjet engines suitable for supersonic propulsion, fuel is injected into the engine to optimise combustion. The angle of fuel injection can be controlled to optimise boundary layer distribution within the engine which in turn improves performance.

It would be advantageous to provide a variable geometry air intake for an air-breathing flight vehicle in which one or more of the aforementioned disadvantages is eliminated or at least reduced.

DISCLOSURE OF THE INVENTION

A first aspect of the invention provides a method of controlling the location of shock waves generated at a leading edge of an engine intake of an engine in a powerplant of a supersonic vehicle so that the shock wave extends in an optimum orientation relative to a cowl lip of the intake thereby altering the effective shape of an air-intake, the method comprising, downstream of a source of shock waves, injecting air into an air flow captured by the air-intake, the air being injected in a direction neither parallel nor substantially parallel to the air flow, and under sufficient pressure for the injected air to penetrate into the captured airflow, whereby a shear layer is formed in the captured airflow for controlling effective shape of the compression surfaces of a supersonic engine intake, wherein the direction and pressure of injection is controlled depending on the velocity of the vehicle so that the shock wave extends in an optimum orientation relative to the cowl lip for optimising the associated shock system geometry.

Thus, the presence of the shear layer alters the effective shape of the air-intake.

The injected fluid may be air, or consist substantially of air, excluding any substantial amounts of for example fuel or fuel vapour.

The presence of the shear layer may induce a further shock wave.

If the air were to be injected parallel to the captured air flow, a shear layer would in general not be formed; thus, the air may be injected at an angle of more than 0.1 degrees, more than 0.5 degrees, more than 1 degree, more than 5 degrees, more than 10 degrees, more than 20 degrees, or more than 30 degrees to the airflow.

The method may further comprise preventing buzz by injecting the air into the air flow at a high angle (which is herein defined as more than 60 degrees).

The method may further comprise reacting to engine failure by injecting the air into the air flow at a high angle (which is herein defined as more than 60 degrees relative to the air flow direction).

A second aspect of the invention provides a supersonic-flight vehicle structure comprising:

an engine having an engine intake comprising a leading edge and a cowl lip such that during supersonic flight the leading edge generates shock waves; an outlet located in the engine intake and being connected to a source of pressurised air so that air can be injected through the outlet in a direction neither parallel nor substantially parallel to the air flow captured by the intake, and under sufficient pressure for the injected air to penetrate into the captured airflow, whereby a shear layer is formed in the captured airflow for controlling effective shape of the compression surfaces of the engine intake thereby controlling shock waves generated at the leading edge; and a control for controlling the direction and pressure of injection depending on the velocity of the vehicle so that the shock waves extend in an optimum orientation relative to the cowl lip for optimising the associated shock system geometry at the engine intake.

The supersonic-flight vehicle structure may be an aircraft. The supersonic-flight vehicle structure may be a wing for an aircraft. The supersonic-flight vehicle may be a missile.

The engine may be a ramjet engine.

The outlet may comprise a plurality of apertures, which may be arranged to provide a plurality of independent jets of injected fluid, or one or more combined jet. Injection of the fluid from a plurality of apertures offers greater control over the shape of the shear layer that is formed; i.e. it offers greater control over the effective geometry of the air-intake compression surfaces.

The air intake may be substantially rectangular in cross-section. In that case, the outlet may be elongate, or may comprise a plurality of apertures forming a line, such that the injected fluid initially forms a substantially flat surface.

The air intake may be an axi-symmetric air-intake. In that case, the outlet may be a ring, or may comprise a plurality of apertures forming a ring, such that the injected fluid initially forms an axi-symmetric surface.

The outlet may be arranged to inject the fluid into the air flow at an angle that is varied in response to changes in operating (for example engine) conditions. For example, the outlet may be arranged to vary the angle of injection relative to the air flow direction in response to changes in vehicle speed.

In an example embodiment, the outlet comprises a cylinder that is rotatable relative to a surface of the vehicle structure, the rotatable cylinder comprising an aperture from which the fluid is injected, connected to the source of fluid. The cylinder and aperture are arranged so that rotation of the cylinder changes the position of the aperture, and hence the direction in which the fluid is injected. The axis of rotation of the cylinder is aligned so that the change in the direction in which the fluid is injected provides a change in the angle of injection relative to the air flow direction. In this example, the axis of rotation of the cylinder is substantially perpendicular to the air flow direction, and substantially parallel to a linear source of the shock wave.

In another example embodiment, the outlet comprises a flap that is rotatably pivoted relative to a surface of the vehicle structure, the flap being adjacent to an aperture from which the fluid is injected, connected to the source of fluid. The flap and aperture are arranged so that rotation of the flap changes the direction in which the fluid is injected from the aperture. The axis of rotation of the flap is aligned so that the change in the direction in which the fluid is injected provides a change in the angle of injection relative to the air flow direction. In this example, the axis of rotation of the flap is substantially perpendicular to the air flow direction, and substantially parallel to a linear source of the shock wave.

The source of fluid may be any source that supplies the fluid at a pressure sufficient for it to be injected into the air flow. In an example embodiment, the source of fluid is a reservoir of fluid at a pressure higher than the pressure of air flowing past the outlet; for example, the fluid may be at a pressure higher than standard atmospheric pressure. In another example embodiment, the source of fluid is a high-pressure bleed from a compressor in a powerplant of the vehicle structure. In another example embodiment, the source of fluid is a bleed from an intake diffuser of the air intake. In each of those examples, the fluid will be injected into the air flow as a result of the pressure difference.

The vehicle structure may comprise a diverter arranged to divert the boundary layer of the incident air flow. The vehicle structure may be arranged such that the fluid injected from the outlet re-energises the boundary layer; in that case, it may be that the air intake does not require a diverter.

Thus, the invention proposes the use of fluid jets or sheets that form shear layers when introduced into the intake flow. Those virtual surfaces replace wholly or in part the function of the conventional solid compression surfaces in the generation of shock waves. The jet flow is injected at appropriate longitudinal locations across a wedge or around the surfaces of revolution for axi-symmetric intakes. This process instigates a separation of the local flow from the surface, which causes the formation of an attendant shock system. For a given Mach number, the geometry of the shock system may be made variable by controlling the jet sheet trajectory, through changes to its pressure or initial angle. Hence, shock positioning can be achieved as a function of Mach number and engine operating condition, without the complication of providing and actuating large moving surfaces.

In extreme manoeuvre and engine demands, when the undesirability of the shock system known as "buzz" becomes likely, the jet sheet may be used to degrade the shock structure to a single shock configuration, which is not subject to the phenomenon.

Thus an air intake may be equipped with means for the introduction or injection of fluid into the freestream or intake capture flow in such a manner as to create predetermined regions of flow separation and shear layers which then act as aerodynamically formed boundaries for the main intake flow. These boundaries may be so arranged as to effectively replace and function as any of the fixed or moveable solid internal or external intake surfaces and profiles that conventionally form the flow boundaries, and so determine or influence the internal characteristics and performance of the intake.

The jet sheet size, configuration, mass flow, speed or trajectory may be varied so that the resulting shear layer profiles generate entry shock systems that suit a given intake operating condition. The shear layer profile is generally determined by the initial trajectory of the jet sheet and, for given freestream conditions and slot width, by jet total pressure. Jet angle may be either fixed or variable, but for simplicity a fixed value may be preferable, provided that sufficient trajectory range is available by regulation of jet pressure alone. The desired intake performance may be achieved by varying the parameters controlling the jet profile as a function of the relevant aircraft and engine parameters. Thus the introduction or injection of the fluid into the free stream or intake capture flow may be controlled, adjusted or governed in terms of at least one of the following parameters: extent, location, configuration, direction, pressure and flow quantity during intake operation, throughout or over any part of the intake operating envelope. The controlled, adjusted or governed parameter may be variable, during intake operation, according to any other parameter which can affect or influence the intake internal characteristics or performance, either throughout or over any part of the intake operating envelope.

The introduced or injected fluid may be utilised to provide, wholly or in part, the means of boundary-layer control and management for the intake, by exploiting flow entrainment and flow energising properties of the said fluid introduction or injection.

The jet may be formed by utilising a suitable supply of high-pressure fluid. An example of a source would be a tapping from the compressor of a powerplant such as a turbojet. Alternatively, a reservoir of gas may be installed in the vehicle structure, suitably sized for the flight duration. That approach would be more appropriate for ramjet-type vehicles.

The flow of gas and the trajectory of the jet may, for example, be controlled as a function of Mach number, manoeuvre conditions, powerplant operating condition, altitude, and ambient temperature.

The jet may be used to re-energise the surface boundary layer, replacing the conventional requirement for boundary layer control by surface bleed. For certain applications, this attribute of the jet sheet could be sufficiently powerful to permit a useful reduction in the size of the boundary layer diverter, or possibly its elimination.

It will of course be appreciated that features described in relation to one aspect of the present invention may be incorporated into other aspects of the present invention. For example, the method of the invention may incorporate any of the features described with reference to the system of the invention and vice versa.

BRIEF DESCRIPTION OF THE DRAWINGS

Example embodiments of the invention will now be described by way of example only and with reference to the accompanying drawings, of which:

FIGS. 3 (a)-(d) show four example embodiments of the invention having different air-intake geometries and fluid outlet arrangements;

FIGS. 5 (a)-(e) show five operating modes of an example embodiment of the present invention;

FIG. 6 is a cross-section through a variable geometry supersonic air intake of vehicle structure according to an example embodiment of the present invention, with a fluid jet (a) off and (b) on;

For convenience and economy, the same reference numerals are used in different figures to label identical or similar elements of the engines shown.

DETAILED DESCRIPTION

In example embodiments of the invention, an air intake for a supersonic air-breathing flight vehicle is equipped with a means for introducing or injecting air, in order to create predetermined regions of separated flow and an attendant fluid shear layer. The shear layer forms an aerodynamic boundary for the capture flow with a profile determined and optimised by appropriate injection of air so that the shock wave extends in an optimum orientation relative to a cowl lip of the intake thereby altering the effective shape of an air-intake. In this way, the air vehicle operation and performance is improved. The aerodynamic boundary so generated replaces mechanically moveable solid surfaces used to vary the geometry of prior-art intakes. Use of an introduced or injected air flow provides the advantages of a variable geometry, but with reduced weight and reduced mechanical complexity.

Figure 1:
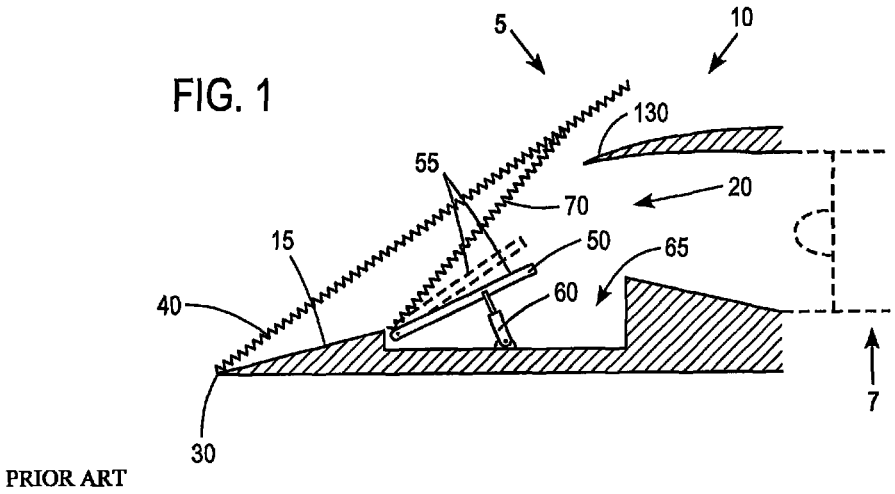
FIG. 1 is a cross-section through a conventional variable-geometry supersonic air intake.

As mentioned in the discussion of the prior art herein above, known arrangements adopt a fuel injection system within for example a ramjet engine for supplying fuel into a combustion region of the engine. As further developments of such engines have evolved, it has been found to be desirable to control fuel injection to alter the distribution of boundary layers generated internally of the engine. That is, controlled injection of fuel in such engines may be considered a relatively small step as injection of fuel is in any case required for the function of the engine. On the other hand, in the embodiments of the present invention described herein, air, which may be ambient air, is used to control effective geometry of the engine intake. The injection of air at the inlet of the engine controls shock wave generation and distribution external to the engine. Previously, as described above, engine intake geometry was controlled by movement of a mechanical surface, as described in relation to FIG. 1.

Additionally, in some example embodiments, the injection of fluid has the effect of re-energising any ingested boundary layer, thus obviating the conventional requirement for a bleed system to provide boundary layer control.

Figure 2:
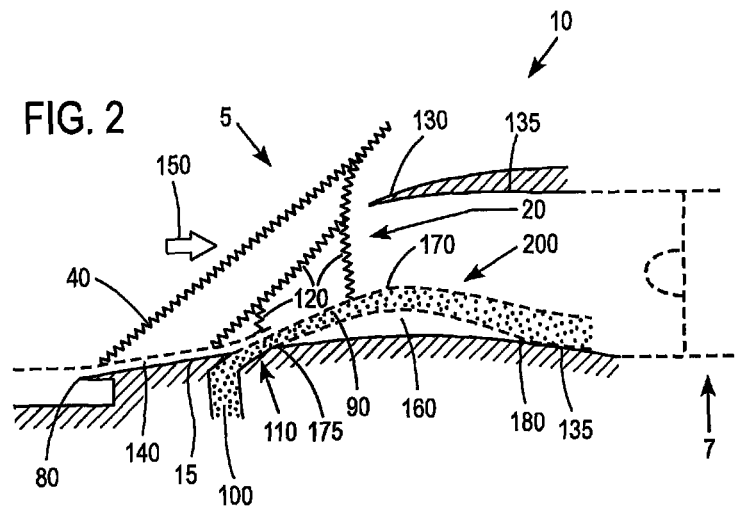
FIG. 2 is a cross-section through a variable-geometry supersonic air intake of a vehicle structure according to an example embodiment of the present invention.

In an example embodiment of the invention (FIG. 2), a powerplant system 5 comprises an air-breathing engine 7 and an air intake 10 having an air-intake aperture 20 defined by intake cowl lip 130, fixed compression surface 15 and interior surface 135. In this example, at the leading edge of fixed compression surface 15 is a lip 80, which acts to separate a surface boundary layer 140 from the main upstream flow 150, in a manner well known in the art. Compression surface 15 comprises an air injection pipe 100, which leads to an air injection aperture 110 in fixed compression surface 15.

In use, air 90 is directed under pressure along pipe 100 to aperture 110, from which it is ejected. The injected fluid 90 creates a separation (in this example a further separation) of the surface boundary layer 140 and upstream flow 150, thus creating a region of separated flow 160. A shear layer 170 is thus formed between a point of flow separation 175 and a point of subsequent jet re-attachment 180 on a downstream part of interior surface 135.

The shear layer 170 (the size of which is exaggerated in the drawings for the sake of clarity) provides part of a compression surface for the capture flow in the supersonic flight regime, thus generating fluid-induced shock waves (in this case lambda shock waves 120), as well as forming the intake throat profile 200. The shear layer changes the effective shape of the compression surfaces of a supersonic engine intake thereby altering the shock wave geometry at the intake to optimise engine performance. The shear layer 170 thus performs the function of flap 50 in the prior art example of FIG. 1.

The jet of air 90 (not to scale in FIG. 3, wherein it is shown as being contiguous with the shear layer 170 that it initiates) can be provided in different arrangements in different example embodiments. Four different arrangements are shown, for example, in FIG. 3. The shock-generating shear layers are shown for alternative jet arrangements for two-dimensional intakes in FIGS. 3 (a), (b) and (c). In the intake 10 of FIG. 3(a), shear 170 generated by the air jet injected from aperture 110 will generate a second shock-wave on the wedge-shaped lower surface 15 of the intake 20. In the intake 10' of FIG. 3(b), the air is injected from two apertures 110, 115, displaced in the direction of air flow in intake 20. The second aperture 115 is connected by pipe 215 to the same source (not shown) of high-pressure air as aperture 110. Injection of the air from a plurality of apertures offers greater control over the shape of the generated shear layer. In the intake 10" of FIG. 3(c), the geometry of the wedge 15 of intake 10 of FIG. 3(a) is substantially reproduced by creating a shear layer 170 over a flat (rather than wedged) surface 210. In FIG. 3(d), intake 10''' comprises a central compression surface 220, from which a circularly symmetrical ring of air 230 is injected into the air intake.

A control is provided for controlling the direction and pressure of injection depending on the velocity of the vehicle so that the shock waves extend in an optimum orientation relative to the cowl lip for optimising the associated shock system geometry at the engine intake. The flight control systems may control injection of air into the intake. This arrangement is especially convenient since the flight controls systems will already have input data concerning the velocity of the vehicle and can therefore readily control air injection into the inlet dependent on velocity. Alternatively a bespoke processing unit may be configured to receive input data concerning vehicle velocity and control air injection accordingly.

Example embodiments in which a variable jet angle is achieved by mechanical means are shown in FIG. 4. In a two-dimensional intake, control is achieved for example by (a) a rotating cylinder 300, or (b) a simple flap 310.

Figure 4A:
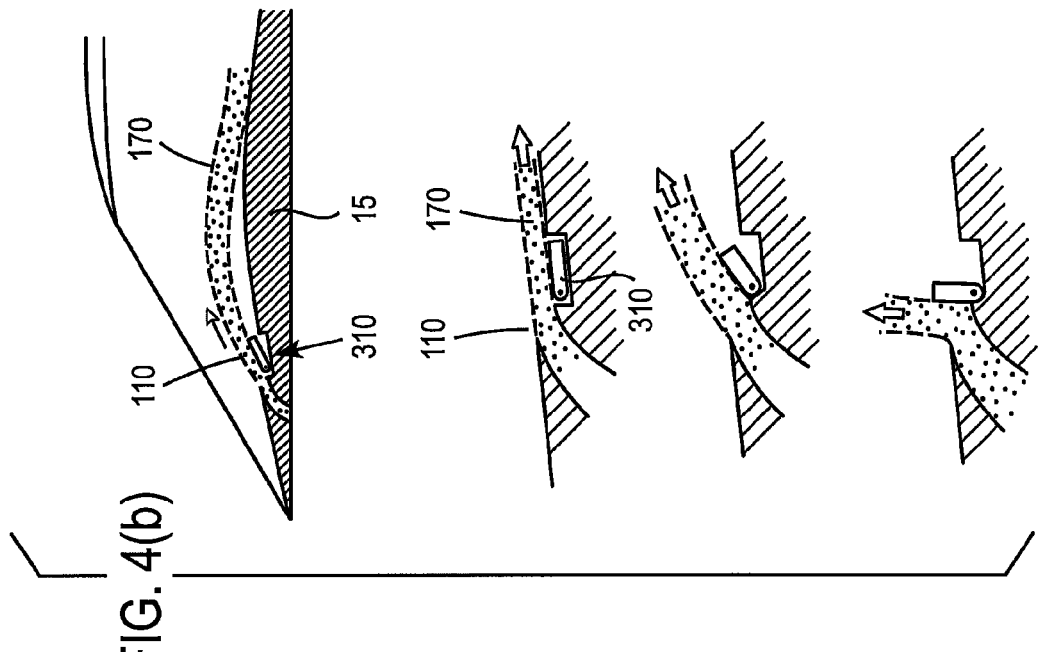
FIGS. 4 (a)-(b) show two example embodiments of the invention having different means for varying a fluid angle in an air intake.

In FIG. 4(a), the outlet of intake 10 comprises a cylinder 300 that is rotatable relative to wedge 15. The rotatable cylinder 300 comprises a linear aperture 305 from which the air is injected. The cylinder 300 and aperture 305 are arranged so that rotation of the cylinder 300 changes the position of the aperture 305, and hence the direction in which the air is injected, and in which the shear layer 170 forms. The axis of rotation of the cylinder 300 is aligned so that the change in the direction in which the air is injected provides a change in the angle of shear layer 170 relative to the air flow direction. The axis of rotation of the cylinder 300 is substantially perpendicular to the air flow direction, and substantially parallel to the forward edge of the air intake 10.

Figure 4B:
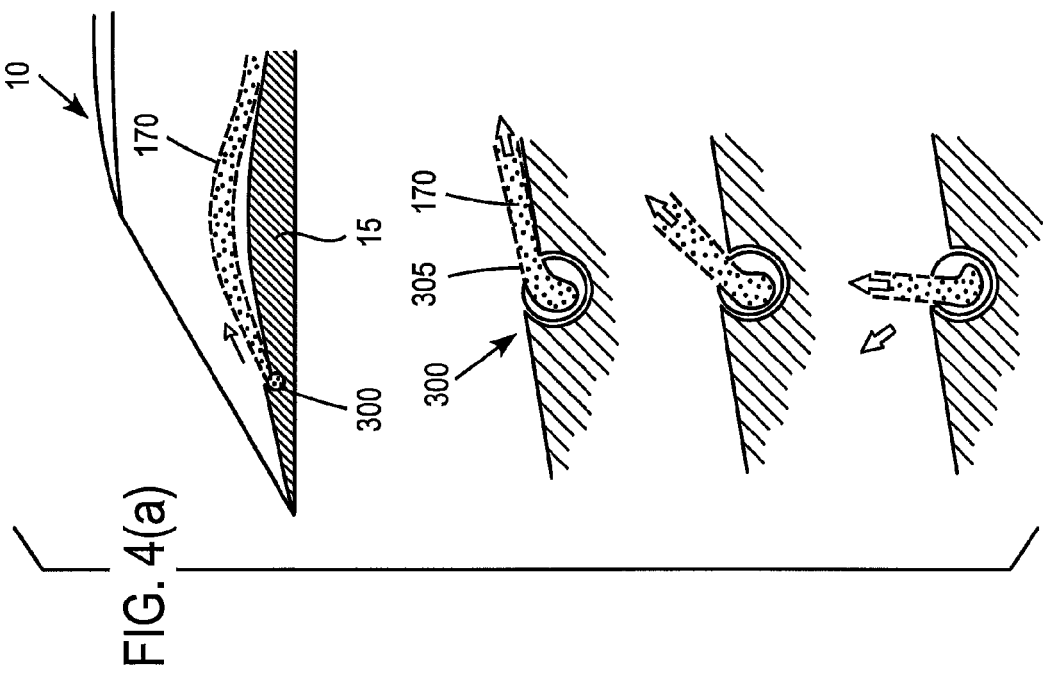

In FIG. 4(b), the outlet 110 comprises a flap 310 that is rotatably pivoted relative to a fixed surface of the vehicle, the flap 310 being adjacent to the outlet 110 from which the air is injected. The flap 310 and outlet 110 are arranged so that rotation of the flap 310 changes the direction in which the air is injected from the outlet 110. The axis of rotation of the flap 310 is aligned so that the change in the direction in which the air is injected provides a change in the angle of shear layer 170 relative to the air flow direction. The axis of rotation of the flap 310 is substantially perpendicular to the air flow direction, and substantially parallel to the forward edge of the air intake.

FIG. 4 also shows the mode of operation of the two example systems. During subsonic flight, the air is injected at a low angle relative to the direction of the air flow, and the injected air provides a boundary-layer control which does not significantly affect engine intake geometry. At supersonic speeds, the air is injected at a higher angle, so that shear layer 170 is formed, and acts as a compression surface to the air flow. In the case of engine failure at supersonic speeds, or if buzz occurs, cylinder 300 or flap 310 is rotated so that air is injected substantially at right-angles to the air-flow direction, simplifying the shock system associated with the intake 10. Deliberately detaching of the shock system by blowing at a high angle (or even in the forward direction) produces a stable shock system, and prevents the occurrence of "buzz" in circumstances of reduced capture mass flow or in limiting vehicle manoeuvres.

FIG. 5 summarises example operating mode for a single jet installation. At low speed or take-off, the jet may be redundant (FIG. 5(a)). In sub-sonic flight, the jet may be used to energise the boundary layer 140 (FIG. 5(b)), or control the entry airflow by creating a separation layer 160 and shear flow layer 170. A typical supersonic cruise shock pattern is shown in FIG. 5 (d) (corresponding to FIG. 2).

Engine failure can cause oscillations in front of engine; as discussed above, the "buzz" or shock system instability phenomenon at reduced mass flow may be suppressed by suitable jet management, as shown in FIG. 5(e). The jet angle and hence the angle of the leading edge of shear layer 170 is made large, relative to the airflow, to convert the shock system towards a benign single "normal shock" configuration 40, 400.

FIG. 6 shows another example of shock-wave patterns with (a) the jet off—in which the forward edge of the intake and the lip of the engine cowl produce shock waves 40, 500 (respectively), and (b) the jet on, in which additional shock wave system 120 is produced.

Figure 7A:
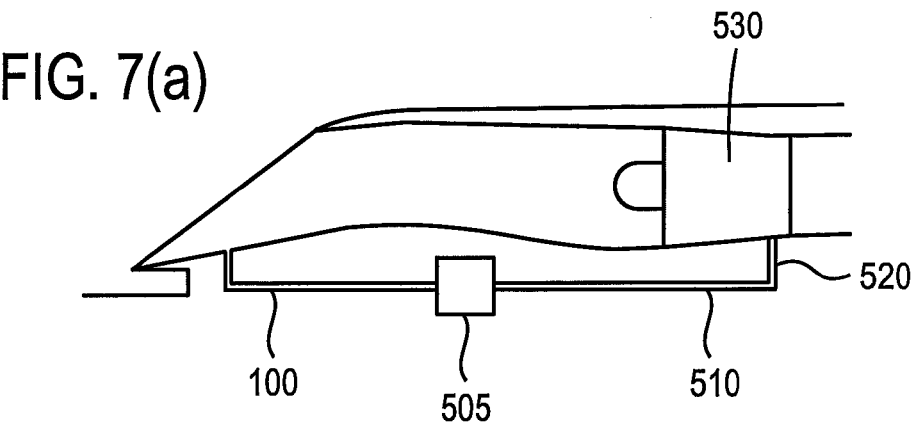
FIG. 7 (a)-(c) show three alternative arrangements for supplying fluid to the fluid outlet of example embodiments of the present invention.
Figure 7B:
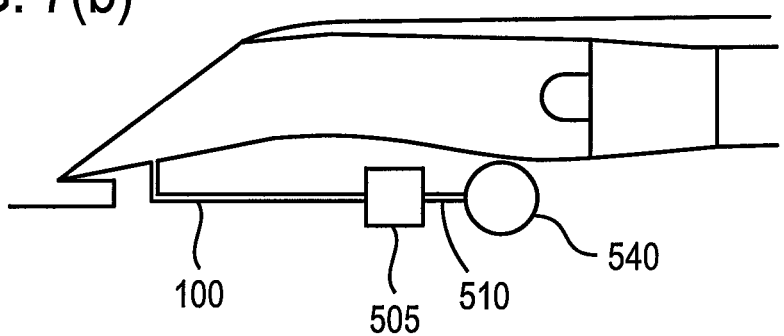
Figure 7C:
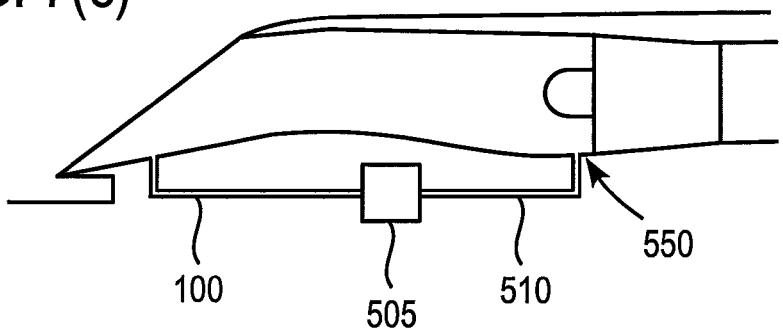

In the example of FIG. 7(a), the air injection pipe 100 is connected via control unit 505 and pipe 510 to a bleed 520 of high-pressure air from powerplant compressor 530. In the example of FIG. 7(b), the air injection pipe 100 is connected via control unit 505 and pipe 510 to a reservoir 540 of high-pressure air. In the example of FIG. 7(c), the air injection pipe 100 is connected via control unit 505 and pipe 510 to a bleed 550 of air from the engine's intake diffuser.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may be absent in other embodiments.

The invention claimed is:

1. A method of controlling a location of shock waves generated at a leading edge of an engine intake of an engine in a powerplant of a supersonic vehicle, the engine intake comprising a surface providing the leading edge and a cowl having a cowl lip downstream of the leading edge, so that the shock wave extends in an optimum orientation relative to the cowl lip, the method comprising:

downstream of the leading edge and upstream of the cowl lip, injecting air into an air flow captured by the air-intake, the air being injected through or adjacent the surface providing the leading edge in a direction neither parallel nor substantially parallel to the air flow, and under sufficient pressure for the injected air to penetrate into the captured airflow, whereby a region of separated flow and a shear layer are formed in the captured airflow for controlling effective shape of the compression surfaces of a supersonic engine intake, and wherein at least one of the direction and the pressure of injection is controlled depending on the velocity of the vehicle so that the shock wave extends in an optimum orientation relative to the cowl lip for optimising the associated shock system geometry.

2. The method of claim 1, wherein the direction and pressure of injection is controlled depending on the velocity of the vehicle so that the shock wave extends onto the cowl lip.

3. The method of claim 1, further comprising injecting air into the air flow at a high angle relative to the air flow direction, in order to prevent buzz or react to engine failure.

4. The method of claim 1, further comprise using the injected air to re-energise the boundary layer of the air flow.

5. A supersonic-flight vehicle structure for a vehicle, the structure comprising:

an engine having an engine intake comprising a surface providing a leading edge which generates shock waves during supersonic flight, and a cowl having a cowl lip downstream of the leading edge;

an outlet through or adjacent the surface providing the leading edge, the outlet being located downstream of the leading edge and upstream of the cowl lip, in the engine intake, and being connected to a source of pressurised air so that air is ejected out of the outlet in a direction neither parallel nor substantially parallel to the air flow captured by the intake, and under sufficient pressure for the ejected air to penetrate into the air flow captured by the intake, whereby a region of separated flow and a shear layer are formed in the air flow captured by the intake for controlling effective shape of the compression surfaces of the engine intake thereby controlling an orientation of shock waves generated at the leading edge; and a control being configured to control at least one of the direction and pressure of the air that is ejected out of the outlet depending on the velocity of the vehicle so that the shock waves extend in an optimum orientation relative to the cowl lip for optimising the associated shock system geometry at the engine intake.

6. A vehicle structure as claimed in claim 5, in which the outlet comprises a plurality of apertures, which are arranged to provide a plurality of independent jets of ejected air, or one or more combined jet.

7. A vehicle structure as claimed in claim 5, in which the air intake is substantially rectangular and the outlet is elongate or comprises a plurality of apertures forming a line, such that the ejected air initially forms a substantially flat surface.

8. A vehicle structure as claimed in claim 5, in which the air intake is axi-symmetric, and the outlet is a ring, or comprises a plurality of apertures forming a ring, such that the ejected air initially forms an axi-symmetric surface.

9. A vehicle structure as claimed in claim 5, wherein the control is configured to control the direction and pressure of the ejected air depending on the velocity of the vehicle so that the shock waves extend onto the cowl lip.

10. A vehicle structure as claimed in claim 5, in which the outlet comprises a cylinder that is rotatable relative to a surface of the vehicle structure, the rotatable cylinder comprising an aperture, from which the air that is ejected out of the outlet is ejected, connected to the source of pressurised air.

11. A vehicle structure as claimed in claim 5, in which the outlet comprises a flap that is rotatably pivoted relative to a surface of the vehicle structure, the flap being adjacent to an aperture, from which the air that is ejected out of the outlet is ejected, connected to the source of pressurised air.

12. A vehicle structure as claimed in claim 5, in which the source of air is a reservoir of air at a pressure higher than the pressure of air flowing past the outlet.

13. A vehicle structure as claimed in claim 5, in which the source of air is a high-pressure bleed from a compressor in a powerplant of the vehicle.

14. A vehicle structure as claimed in claim 5, in which the source of air is a bleed from an intake diffuser of the air intake.

* * * * *